United States Patent
Alagar et al.

(10) Patent No.: US 11,463,459 B2
(45) Date of Patent: *Oct. 4, 2022

(54) NETWORK SECURITY INTRUSION DETECTION

(71) Applicant: Bank of America Corporation, Charlotte, NC (US)

(72) Inventors: Ramesh Alagar, Chennai (IN); Prabakar Rangarajan, Chennai (IN)

(73) Assignee: Bank of America Corporation, Charlotte, NC (US)

(*) Notice: Subject to any disclaimer, the term of this patent is extended or adjusted under 35 U.S.C. 154(b) by 74 days.

This patent is subject to a terminal disclaimer.

(21) Appl. No.: 17/184,803

(22) Filed: Feb. 25, 2021

(65) Prior Publication Data

US 2021/0203678 A1 Jul. 1, 2021

Related U.S. Application Data

(63) Continuation of application No. 16/216,631, filed on Dec. 11, 2018, now Pat. No. 10,965,694.

(51) Int. Cl.
| | |
|---|---|
| *H04L 9/40* | (2022.01) |
| *G06F 16/901* | (2019.01) |
| *G06N 3/02* | (2006.01) |
| *H04L 67/02* | (2022.01) |
| *G06N 3/08* | (2006.01) |

(52) U.S. Cl.
CPC ...... *H04L 63/1416* (2013.01); *G06F 16/9027* (2019.01); *G06N 3/02* (2013.01); *G06N 3/08* (2013.01); *H04L 63/145* (2013.01); *H04L 67/02* (2013.01)

(58) Field of Classification Search
CPC combination set(s) only.
See application file for complete search history.

(56) References Cited

U.S. PATENT DOCUMENTS

| | | | |
|---|---|---|---|
| 7,016,953 | B2 | 3/2006 | Lemon |
| 7,072,951 | B2 | 7/2006 | von Klopp et al. |
| 7,099,939 | B2 | 8/2006 | von Klopp et al. |
| 8,024,785 | B2 | 9/2011 | Andress et al. |
| 8,259,588 | B2 | 9/2012 | Selitser et al. |
| 2005/0022012 | A1* | 1/2005 | Bluestone ............. H04L 63/104 726/4 |
| 2008/0133517 | A1* | 6/2008 | Kapoor ............... H04L 63/1408 |
| 2011/0231510 | A1* | 9/2011 | Korsunsky .............. G06F 21/55 709/213 |
| 2012/0254285 | A1* | 10/2012 | Tiger ..................... H04L 47/20 709/202 |

(Continued)

*Primary Examiner* — Ayoub Alata

(57) ABSTRACT

An intrusion detection system that includes a processor configured to receive HyperText Transfer Protocol (HTTP) data and to convert the HTTP data into a data tree object that links field values from the HTTP data. The processor is further configured to identify a field value from the data object tree and to determine a set of feature values for the field value corresponding with input features for the neural network model. The processor is further configured to apply the determined set of feature values to the neural network model to generate an attack vector array. The attack vector array includes flag bits that each correspond with an attack type. The processor is further configured to trigger an event in response to determining that at least one flag bit is set.

20 Claims, 5 Drawing Sheets

(56) References Cited

U.S. PATENT DOCUMENTS

| | | | |
|---|---|---|---|
| 2012/0311659 A1* | 12/2012 | Narain | H04W 12/0023 |
| | | | 726/1 |
| 2013/0097710 A1* | 4/2013 | Basavapatna | H04W 4/02 |
| | | | 726/25 |
| 2017/0289186 A1* | 10/2017 | Staniford | H04L 63/1425 |
| 2020/0186548 A1 | 6/2020 | Alagar et al. | |

* cited by examiner

| Field Value | SQL Keywords | OS Keywords | JS Keywords | ( | ) | < | > | - | — | = | * | & |
|---|---|---|---|---|---|---|---|---|---|---|---|---|
| 'DELETE FROM USERS' | 2 | 0 | 0 | 0 | 0 | 0 | 0 | 2 | 0 | 0 | 0 | 0 |
| '"DELETE FROM USERS"' | 2 | 0 | 0 | 0 | 0 | 0 | 0 | 6 | 0 | 0 | 0 | 0 |
| 'DELETE FROM USERS WHERE 1=1' | 3 | 0 | 0 | 0 | 0 | 0 | 0 | 2 | 0 | 1 | 0 | 0 |
| 'DELETE FROM USERS WHERE 2=2' | 3 | 0 | 0 | 0 | 0 | 0 | 0 | 2 | 0 | 1 | 0 | 0 |
| 'DELETE FROM USERS WHERE '1'='1'' | 3 | 0 | 0 | 0 | 0 | 0 | 0 | 6 | 0 | 1 | 0 | 0 |

FIG. 3

NETWORK SECURITY INTRUSION DETECTION

CROSS-REFERENCE TO RELATED APPLICATIONS

This application is a continuation of U.S. patent application Ser. No. 16/216,631 filed Dec. 11, 2018, by Ramesh Alagar et al., and entitled "NETWORK SECURITY INTRUSION DETECTION," which is incorporated herein by reference.

TECHNICAL FIELD

The present disclosure relates generally to network security, and more specifically to intrusion detection in a network environment.

BACKGROUND

Many computer systems have expansive networks that include a large number of network devices. These computer systems allow data to be shared among the different network devices. One of the technical challenges that occurs in a computer system is controlling data leakage and unauthorized access to data. For example, a bad actor (e.g. a hacker) may connect to a network to extract data or to perform other malicious activities. Identifying malicious attacks or intrusions in a network poses several technical challenges. Existing systems use signature-based approaches that can only detect an intrusion by looking for exact matches to previous intrusions. For example, a bad actor may use particular command strings during an attack. Existing systems detect that an attack is occurring by checking for exact matches of command strings that were used in a previous attack. This approach is unable to detect attacks that have not previously occurred or attacks that are a variation of a previous attack. In other words, existing approaches are unable to detect an attack when a bad actor uses a modified version of the command string that was used in a previous attack. Other existing approaches are based on network packet sniffing and suffer from a high false negative intrusion detection rate. In other words, these systems incorrectly identify network activity as being acceptable when the network activity is actually an attack. Computer systems are vulnerable to having sensitive data leave the network and/or allowing malicious data (e.g. viruses and spyware) to enter the network without the ability to detect attacks or intrusions. Thus, it is desirable to provide a solution that provides the ability to detect attacks or intrusions within a network.

SUMMARY

Many computer systems have expansive networks that include a large number of network devices. These computer systems allow data to be shared among the different network devices. One of the technical challenges that occurs in a computer system is controlling data leakage and unauthorized access to data. For example, a bad actor (e.g. a hacker) may connect to a network to extract data or to perform other malicious activities. Identifying malicious attacks or intrusions in a network poses several technical challenges. Existing systems use signature-based approaches that can only detect an intrusion by looking for exact matches to previous intrusions. For example, a bad actor may use particular command strings during an attack. Existing systems detect that an attack is occurring by checking for exact matches of command strings that were used in a previous attack. This approach is unable to detect attacks that have not previously occurred or attacks that are a variation of a previous attack. In other words, existing approaches are unable to detect an attack when a bad actor uses a modified version of the command string that was used in a previous attack. Other existing approaches are based on network packet sniffing and suffer from a high false negative intrusion detection rate. In other words, these systems incorrectly identify network activity as being acceptable when the network activity is actually an attack. Computer systems are vulnerable to having sensitive data leave the network and/or allowing malicious data (e.g. viruses and spyware) to enter the network without the ability to detect attacks or intrusions.

One example of an attack occurs when a bad actor gains unauthorized access to a computer system to introduce scripts or malware for performing malicious activities on the computer system. Once malware is downloaded by the computer system, the malware can overload computing resources by running authorized programs and scripts on the system. In addition, malware can cause problems such as disruptions to computer operations, data exfiltration, unauthorized access to system resources, slower processing speeds, connectivity issues, and frequent freezing or crashing. While computing resources are occupied by malware, the computer system has less processing resources and memory to perform other operations. This results in reduced performance of the system. Malware may also reduce the network bandwidth of the computer system by making unauthorized downloads or exfiltrating data from the computer system. Reducing the network bandwidth of the computer system limits the system's ability to send and receive data which degrades the throughput of the system.

The system described in the present application provides a technical solution to the technical problems discussed above by employing machine learning and trained neural network models to detect attacks within a network. The disclosed system provides several advantages which include 1) learning attack patterns and behaviors based on previously identified attacks, 2) enabling the ability to detect new attacks, previously seen attacks, and variants of previously seen attacks, and 3) reducing the number of false negative intrusion detections compared to existing approaches.

In one embodiment, the intrusion detection system provides the ability to detect new attacks or variants of previously seen attacks that are occurring in a network. The intrusion detection system is configured to process HTTP data that is transmitted through the network to extract features values (e.g. keyword counts and character counts) for the HTTP data. The intrusion detection system is configured to use the extracted feature values as inputs for a neural network model to generate an attack vector array. The attack vector array comprises a plurality of flag bits that are used to indicate the presence of any detected attacks. In contrast to signature-based approaches, the intrusion detection system uses trained neural network models to identify attacks based on learned attack patterns and behavior rather than only relying on identifying exact matches to previously identified attacks.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description.

FIG. 3 is an embodiment of a set of feature values for different types of HTTP data;

DETAILED DESCRIPTION

The system described in the present application provides a technical solution to the technical problems discussed above by employing machine learning and trained neural network models to detect attacks within a network. The disclosed system provides several advantages which include 1) learning attack patterns and behaviors based on previously identified attacks, 2) enabling the ability to detect new attacks, previously seen attacks, and variants of previously seen attacks, and 3) reducing the number of false negative intrusion detections compared to existing approaches.

Figure 1:
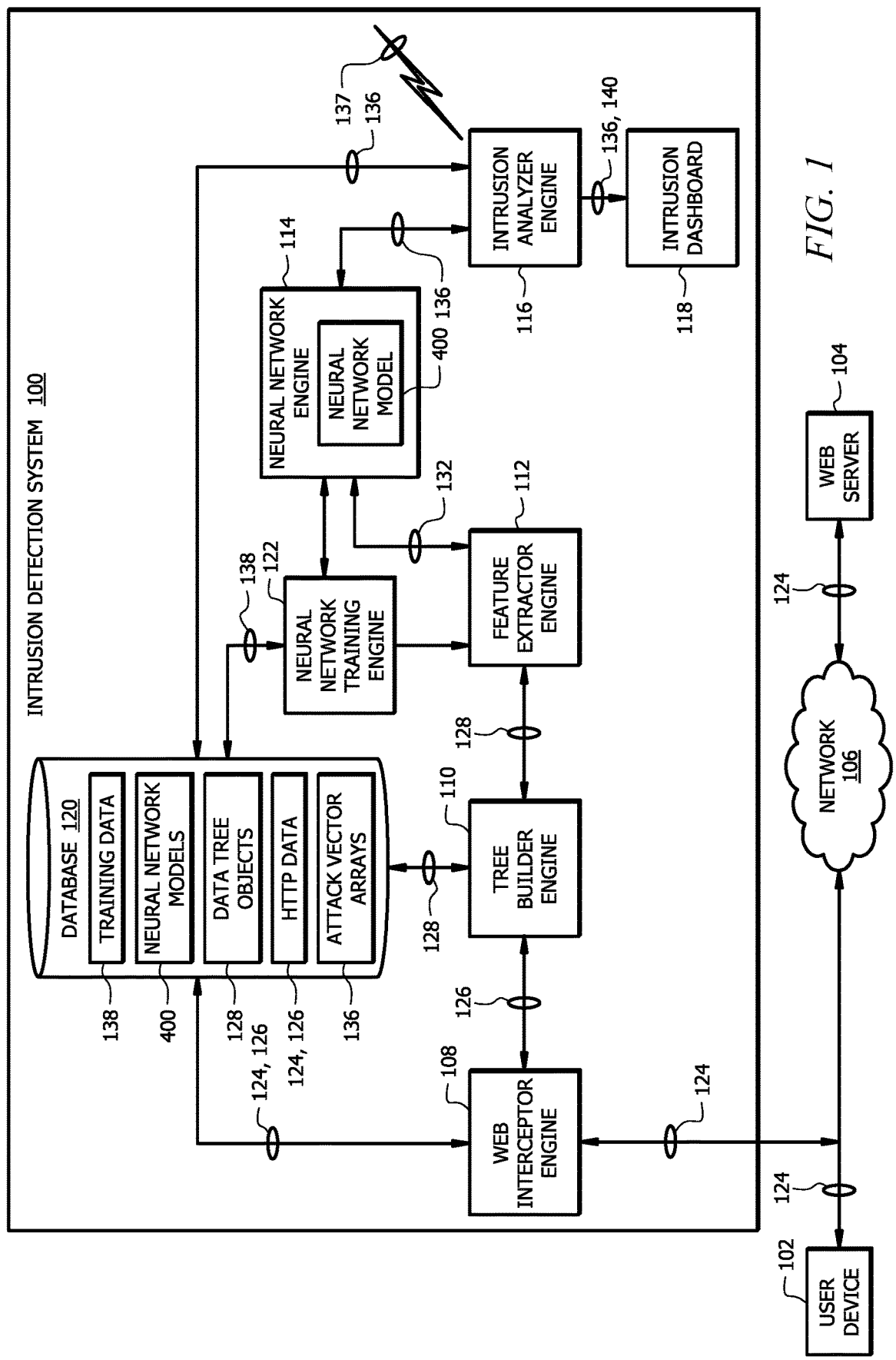
FIG. 1 is a schematic diagram of an embodiment of an intrusion detection system.
Figure 2:
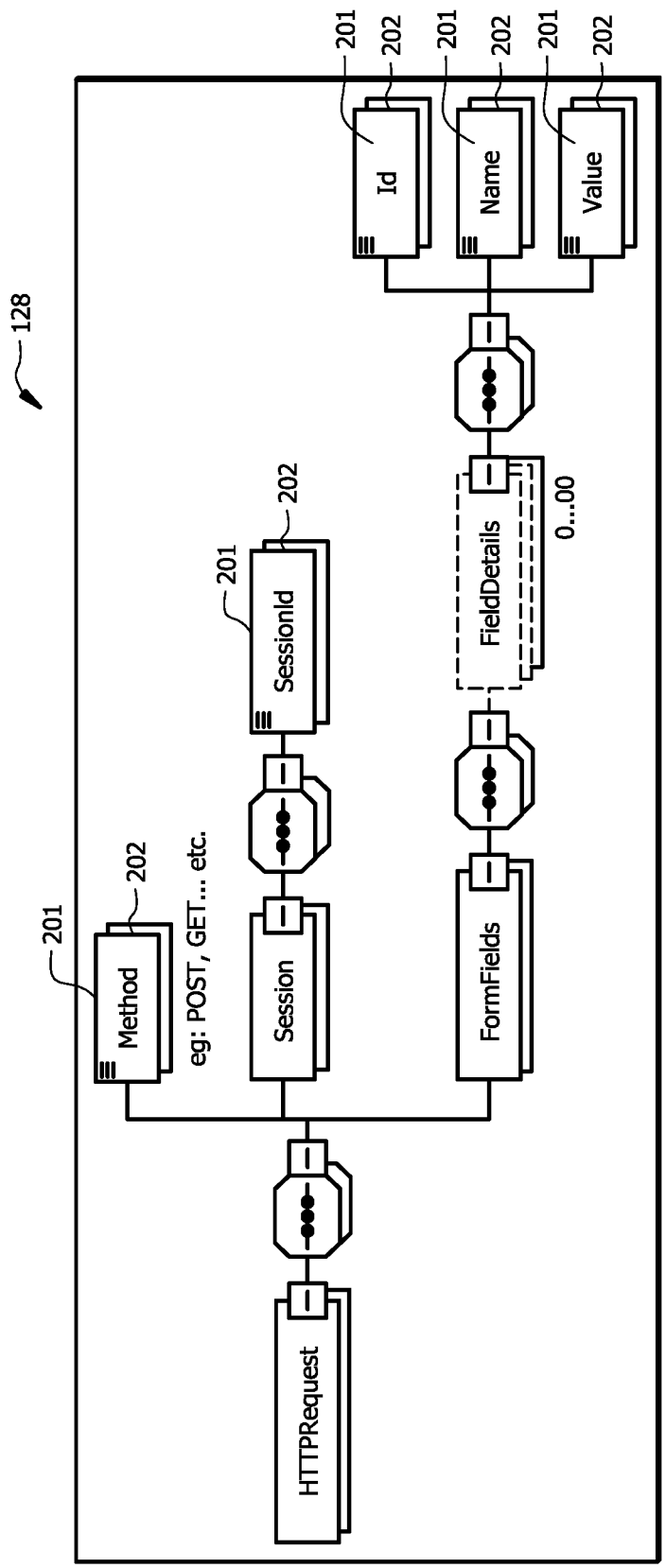
FIG. 2 is an embodiment of a data tree object used by the intrusion detection system.
Figure 4:
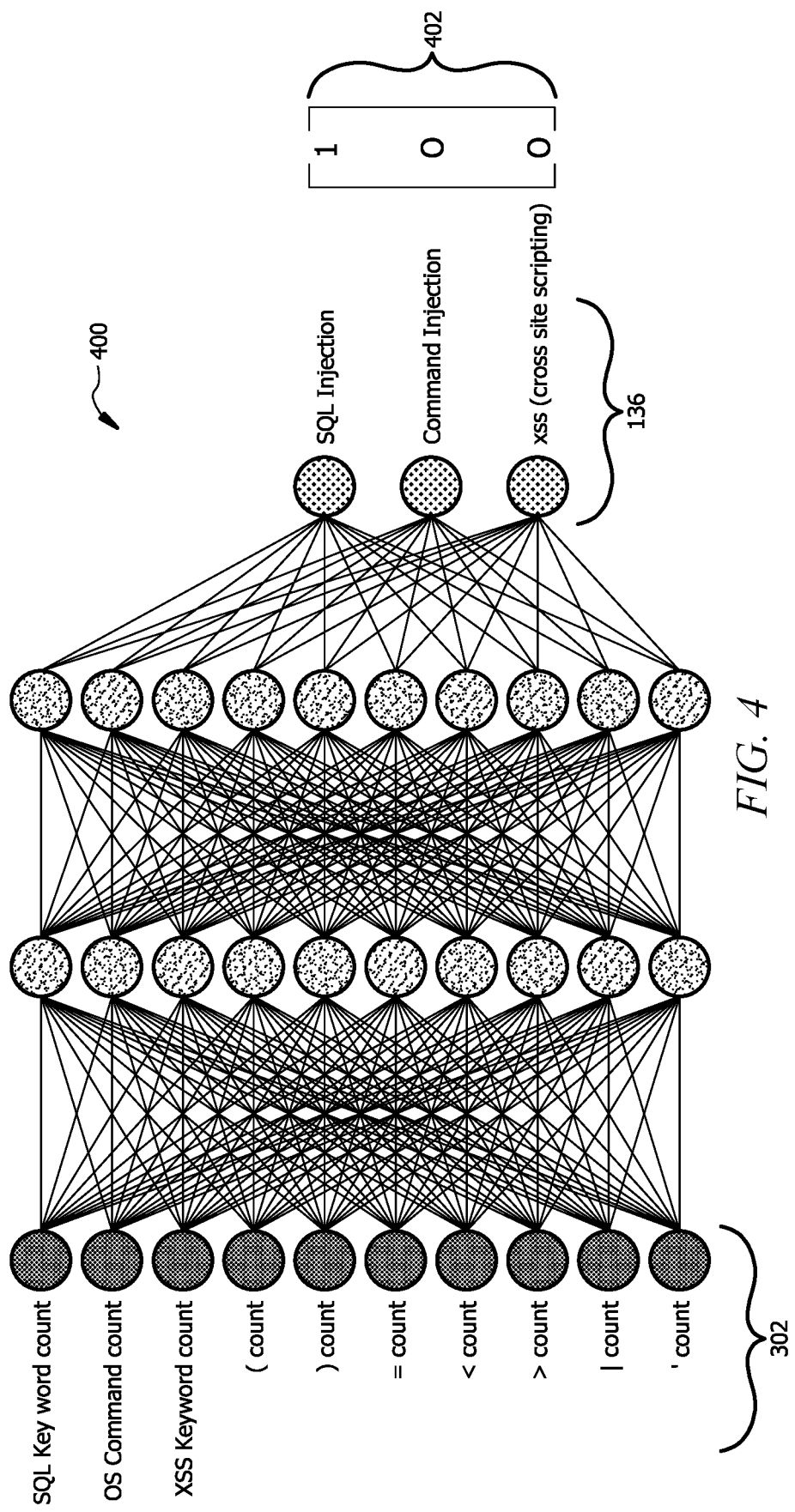
FIG. 4 is an embodiment of a neural network model employed by the intrusion detection system.
Figure 5:
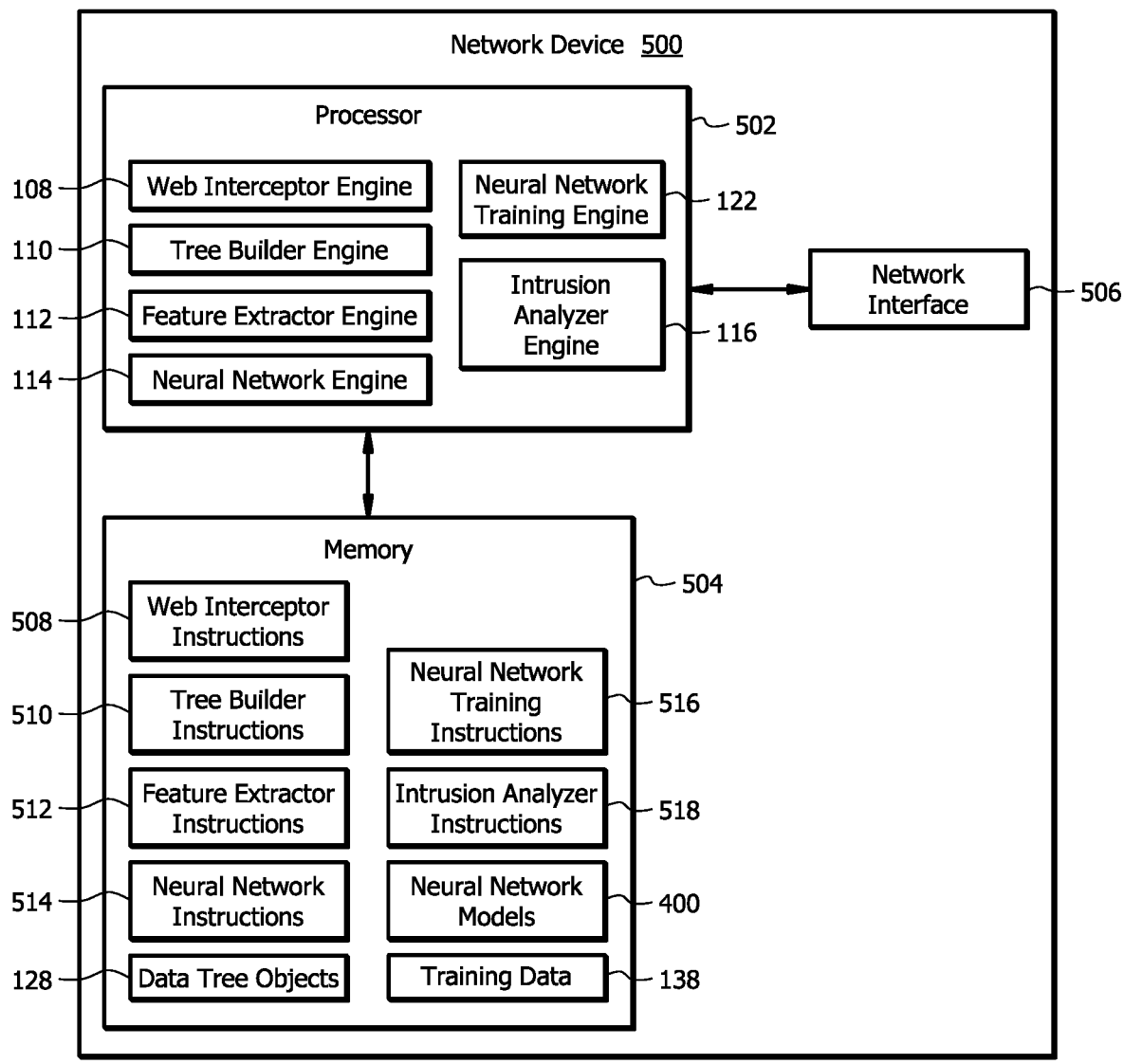
FIG. 5 is a schematic diagram of an embodiment of a network device configured to implement the intrusion detection system.

FIG. 1 is an example of an intrusion detection system configured to detect attacks (e.g. intrusions) in a network. FIG. 2 is an example of data structure for storing unstructured HyperText Transfer Protocol (HTTP) data that is used by the intrusion detection system. FIG. 3 is an example of different types of HTTP data and information about their features. FIG. 4 is an example of neural network model that is used by the intrusion detection system to detect the presence of an attack based on different features of collected HTTP data. FIG. 5 is an example of a network device configured to implement the intrusion detection system.

FIG. 1 is a schematic diagram of an embodiment of an intrusion detection system 100. The intrusion detection system 100 is generally configured to detect intrusions or other types of malicious activities that are present in web traffic data 124 that is being transmitted between a user device 102 and a web server 104 over a network 106. Examples of web traffic data 124 include, but are not limited to, HTTP requests and HTTP responses. For example, the user device 102 may send a series of HTTP requests to the web server 104. The web server 104 may respond by sending a series of HTTP responses to the user device 102.

Examples of user devices 102 include, but are not limited to, computers, Internet-of-things (IoT) devices, mobile devices (e.g. smart phones or tablets), web clients, or any other suitable type of network device. The web server 104 may be any suitable type of server or other network device as would be appreciated by one of ordinary skill in the art. For example, the web server 104 may be formed by one or more physical devices configured to provide services and resources (e.g. data and/or hardware resources) for user devices 102. In one embodiment, the web server 104 may be configured to execute one or more web applications or services for a user device 102.

The network 106 is any suitable type of wireless and/or wired network including, but not limited to, all or a portion of the Internet, an Intranet, a private network, a public network, a peer-to-peer network, the public switched telephone network, a cellular network, a local area network (LAN), a metropolitan area network (MAN), a wide area network (WAN), and a satellite network. The network 106 may be configured to support any suitable type of communication protocol as would be appreciated by one of ordinary skill in the art upon viewing this disclosure.

Intrusion Detection System

In one embodiment, the intrusion detection system 100 comprises a web interceptor engine 108, a tree builder engine 110, a feature extractor engine 112, a neural network engine 114, an intrusion analyzer engine 116, an intrusion dashboard 118, a database 120, and a neural network training engine 122. The intrusion detection system 100 may be configured as shown or in any other suitable configuration.

Process Flow Overview

The following is a non-limiting overview of how the intrusion detection system 100 operates. Additional details about the web interceptor engine 108, the tree builder engine 110, the feature extractor engine 112, the neural network engine 114, the intrusion analyzer engine 116, the intrusion dashboard 118, the database 120, and the neural network training engine 122 are provided below.

The intrusion detection system 100 uses the web interceptor engine 108 to periodically receive HTTP data 124 that is being transmitted through the network 106. The web interceptor engine 108 is configured to collect HTTP data 124 from the network 106 that can be processed to determine whether an attack is occurring. The intrusion detection system 100 uses the tree builder engine 110 to transform the HTTP data 124 from an unstructured format to a structured format, for example a data tree object 128. The tree builder engine 110 is configured to transform raw unstructured HTTP data 124 into a format that supports faster and more efficient processing by the intrusion detection system 100. The intrusion detection system 100 uses the feature extractor engine 112 to extract feature values (e.g. keyword counts and character counts) from the structured HTTP data (i.e. the data tree object 128). The feature extractor engine 112 parses the HTTP data 124 to identify characteristics that can be used for detecting the presence of an attack. The intrusion detection system 100 uses the neural network engine 114 to apply the extracted feature values to a neural network model 400 to generate an attack vector array 136. The neural network engine 114 employs a neural network model that was trained to identify attack patterns and behavior based on previously identified attacks. The intrusion detection system 100 uses the intrusion analyzer engine 116 to analyze the generated attack vector array 136 to determine whether any attacks were detected. The intrusion analyzer engine 116 uses the generated attack vector to identify the presence of any attacks.

The intrusion detection system 100 uses the intrusion dashboard 118 to report any detected attacks. For example, the intrusion dashboard may provide information about any detected attacks and remedies for any detected attacks. The intrusion detection system 100 uses the neural network training engine 122 to generate or train the neural network model 400 that is used for detecting attacks. The neural network training engine 122 is configured to use training data to generate and train neural network models that can identify attack patterns and behavior based on previously identified attacks.

Web Interceptor Engine

The web interceptor engine 108 is configured to intercept HTTP data 124 that is communicated between network devices (e.g. the user device 102 and the web server 104) and to feed the HTTP data 124 into the intrusion detection system 100 for processing. In one embodiment, the web interceptor engine 108 is configured to generate a copy of the HTTP data 126 and to forward the copy of the HTTP data 126 to the tree builder engine 110. The web interceptor engine 108 may be configured to generate and send copies of the HTTP data 126 synchronously or asynchronously. In some embodiments, the web interceptor engine 108 may implemented by or integrated with the user device 102, the web server 104, or any other network device in the network 106. For example, the web interceptor engine 108 may be an application plug-in that is executed on the user device 102 or the web server 104.

Tree Builder Engine

The tree builder engine 110 is configured to receive the HTTP data 126 and to convert the HTTP data 126 into a data tree object 128. Converting the HTTP data 126 into a data tree object 128 transforms the HTTP data 126 from an unstructured format to a structured format (i.e. a data tree object 128). A data tree object 128 is a predetermined data structure that links a set of field values. Data tree objects 128 enable the intrusion detection system 100 to search and perform other operations on the HTTP data 126 which could not be performed when the HTTP data 126 is in a raw unstructured format. Data tree objects 128 also provide the ability to visualize the HTTP 126. An example of a data tree object 128 is described in FIG. 2.

Referring to FIG. 2, the data object tree 128 is a data structure that links a plurality of entries 201 for field values 202. Examples of data tree objects 128 include, but are not limited to, binary trees or any other suitable type of data structure. The structure of the data tree object 128 links and defines relationships between different field values 202. In this example, the data tree object 128 comprises entries 201 for a Method field value 202, a SessionId field value 202, an Id field value 202, a Name field value 202, and a Value field value 202. In other examples, the data tree object 128 may comprise any suitable number of or type of entries 201 for field values 202. An example of using field values 202 is described in FIG. 3.

Returning to FIG. 1, the tree builder engine 110 may be configured to convert the HTTP data 126 into the data tree object 128 by parsing the HTTP data 126 to identify field values 202 within the HTTP data 126 and then populating entries 201 in the data tree object 128 with the identified field values 202. The tree builder engine 110 may be further configured to store a copy of the generated data tree object 128 in memory (e.g. database 120).

Feature Extractor Engine

The feature extractor engine 112 is configured to receive a data tree object 128 and to identify field values 202 within the data tree object 128. The feature extractor engine 112 may be configured to employ any suitable search technique for identifying field values 202 within the data tree object 128. For example, the feature extractor engine 112 may be configured to execute a Knuth-Morris-Pratt (KMP) string searching algorithm. The feature extractor engine 112 is further configured to determine a set of feature values 302 for the field value 202 corresponding with input features for a neural network model (e.g. neural network model 400).

Referring to FIG. 3 as an example, a set of feature values 302 are shown for different field values 202. Each field value 202 comprises a text string. Existing systems use a signature-based approach that detects an attack is occurring by checking for exact matches of the command string that was used in a previous attack. In this example, each field value 302 is a variant of a command DELETE FROM USERS. Because existing approaches rely on looking for exact matches to previously seen attacks, these approaches are unable to detect an attack that uses a variant of a previous attacks such as the examples shown in FIG. 3. In contrast, the intrusion detection system 100 is able to detect new attacks, previously seen attacks, and variants of previously seen attacks.

In one embodiment, feature values 302 are numeric values that quantify different characteristics of a field value 202. Examples of characteristics include, but are not limited to, keyword counts and character counts. In FIG. 3, the set of feature values 302 comprises a Structured Query Language (SQL) keyword count, an Operating System (OS) keyword count, a JavaScript (JS) keyword count, a '(' character count, a ')' character count, a '<' character count, a '>' character count, a '"' character count, a '|' character count, a '=' character count, a '*' character count, and a '&' character count. In other examples, the set of feature values 302 may comprise any other suitable combination and/or number of characteristic counts. The feature values 302 are determined based on the text string of the field value 202. For example, for the field value 202 with a text string 'DELETE FROM USERS', the feature values 302 may indicate that the field value 202 includes two SQL keywords and two '"' characters. As another example, for the field value 202 with a text string 'DELETE FROM USERS', the feature values 302 may indicate that the field value 202 includes two SQL keywords and six '"' characters. Returning to FIG. 1, the feature extractor 112 is configured to send the determined set of feature values 302 to the neural network engine 114.

Neural Network Engine

The neural network engine 114 is configured to receive the set of feature values 302 and to apply the set of feature values 302 to a neural network model to generate an attack vector array 136. An attack vector array 136 comprises a plurality of flag bits 402 that each correspond with an attack type. Referring to FIG. 4 as an example, the neural network model 400 is configured to use a set of feature values 302 as inputs and to output an attack vector array 136. The neural network model 400 may be any suitable type of neural network model and may comprise any suitable number of neurons and/or layers (e.g. hidden layers). In this example, the attack vector array 136 comprises flag bits 402 corresponding with an SQL injection attack type, a command injection attack type, and a cross site scripting attack type. In other examples, the attack vector array 136 may comprise flag bits 402 corresponding with any other suitable attack types. For instance, the attack vector array 136 may comprise one or more attack types identified by the Open Web Application Security Project (OWASP). The neural network model 400 is configured to indicate an attack type is present by setting a flag bit 402 corresponding with the attack type. For instance, in FIG. 4, the neural network model 400 may determine that an SQL injection attack type is present based on the provided set of feature values 302 and may set the flag bit 402 corresponding with an SQL attack type to one. In other examples, the neural network model 400 may be configured to use any other suitable technique for indicating the presence of an attack type. Returning to FIG. 1, the neural network engine 114 sends the generated attack vector array 136 to the intrusion analyzer engine 116.

Intrusion Analyzer Engine

The intrusion analyzer engine 116 is configured to determine whether the attack vector array 136 comprises any set flag bits 402 and to trigger an event 137 (e.g. an alert or instructions) in response to determining that at least one flag bit 402 is set in the attack vector array 136. For example, the intrusion analyzer engine 116 may send an alert in response to determining that at least one flag bit 402 is set. The alert may be an email, a text message (e.g. a short message service (SMS) message), an application pop-up alert, or any other suitable type of message notification. As another example, triggering an event 137 may cause the intrusion detection system 100 to automatically perform one or more actions to isolate or block a detected attack. For instance, the intrusion analyzer engine 116 may block or redirect communications between the user device 102 and the web server 104 in response to determining that at least one flag bit 402 is set. The intrusion analyzer engine 116 may send instructions or commands to the web server 104 or another network devices in the network 106 to block or redirect communications sent by the user device 102. The intrusion analyzer engine 116 may be further configured to store the attack vector array 136 in the database 120.

Intrusion Dashboard

The intrusion dashboard 118 is configured to provide an interface (e.g. a web portal) for displaying information and reports about detected attacks and/or remedies for detected attacks. For example, the intrusion dashboard 118 may receive information 140 from the intrusion analyzer engine 116 about detected intrusions based on the attack vector array 136. The intrusion dashboard 118 may share or display the received information 140 which allows an operator to view the information about any detected attacks and to take appropriate action. For example, the information 140 may identify one or more detected attacks and may provide suggested actions to isolate or block the detected attacks. In one embodiment, the intrusion dashboard 118 may be configured to receive information 140 about false positive intrusion detections. The intrusion dashboard 118 may share or display the received information 140 which allows an operator to provide instructions for augmenting the training data for the neural network model 400.

Neural Network Training Engine

The neural network training engine 122 is configured to generate and refine the neural network model 400 based on training data 138. For example, the training data 138 may comprise field values 202 from instances of known intrusions or attacks. The neural network training engine 122 processes the training data 138 to learn attack patterns and behavior from previously identified attacks and to generate a neural network model similar to the neural network model 400 described in FIG. 4. The generated neural network model 400 is configured to detect both signature-based attacks (i.e. previously seen attacks) and new attacks that have not been previously seen. The neural network training engine 122 may be further configured to receive training data 138 and/or instructions from the intrusion analyzer engine 116 for refining a neural network model 400.

Database

The database 120 may be in signal communication with one or more of the web interceptor engine 108, the tree builder engine 110, the feature extractor engine 112, the neural network engine 114, the intrusion analyzer engine 116, the intrusion dashboard 118, and the neural network training engine 122. Examples of the database 120 include, but are not limited to, memories or other network devices. In one embodiment, the database 120 may be a local memory (e.g. memory 504) or remote memory device. The database 120 is configured to store information for the intrusion detection system 100. For example, the database 120 is operable to store training data 138, neural network models 400, data tree objects 128, HTTP data 124, copies of HTTP data 126, attack vector arrays 136, or any other suitable type of data.

Intrusion Detection Device

FIG. 5 is a schematic diagram of an embodiment of a network device 500 configured to implement the intrusion detection system 100. The network node 500 comprises a processor 502, a memory 504, and a network interface 506. The network device 500 may be configured as shown or in any other suitable configuration.

The processor 502 comprises one or more processors operably coupled to the memory 504. The processor 502 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 502 may be a programmable logic device, a microcontroller, a microprocessor, or any suitable combination of the preceding. The processor 502 is communicatively coupled to and in signal communication with the memory 504. The one or more processors are configured to process data and may be implemented in hardware or software. For example, the processor 502 may be 8-bit, 16-bit, 32-bit, 64-bit or of any other suitable architecture. The processor 502 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions to implement the web interceptor engine 108, the tree builder engine 110, the feature extractor engine 112, the neural network engine 114, the neural network training engine 122, and the intrusion analyzer engine 116. In this way, processor 502 may be a special purpose computer designed to implement function disclosed herein. In an embodiment, the web interceptor engine 108, the tree builder engine 110, the feature extractor engine 112, the neural network engine 114, the neural network training engine 122, and the intrusion analyzer engine 116 are each implemented using logic units, FPGAs, ASICs, DSPs, or any other suitable hardware. The web interceptor engine 108, the tree builder engine 110, the feature extractor engine 112, the neural network engine 114, the neural network training engine 122, and the intrusion analyzer engine 116 are configured as described in FIG. 1.

The memory 504 comprises one or more disks, tape drives, or solid-state drives, and may be used as an over-flow data storage device, to store programs when such programs are selected for execution, and to store instructions and data that are read during program execution. The memory 504 may be volatile or non-volatile and may comprise read-only memory (ROM), random-access memory (RAM), ternary content-addressable memory (TCAM), dynamic random-access memory (DRAM), and static random-access memory (SRAM). The memory 504 is operable to store the web interceptor instructions 508, the tree builder instructions 510, the feature extractor instructions 512, the neural network instructions 514, the neural network training instructions 516, the intrusion analyzer instructions 518, data tree objects 128, neural network models 400, training data 520, and/or any other data or instructions. The web interceptor instructions 508, the tree builder instructions 510, the feature extractor instructions 512, the neural network instructions 514, the neural network training instructions 516, and the intrusion analyzer instructions 518 may comprise any suitable set of instructions, logic, rules, or code operable to execute the web interceptor engine 108, the tree builder engine 110, the feature extractor engine 112, the neural network engine 114, the neural network training engine 122, and the intrusion analyzer engine 116, respectively.

Data tree objects 128 are similar to the data tree objects 128 described in FIGS. 1 and 2. Neural network models 400 are similar to the neural network models 400 described in FIGS. 1 and 4. Training data 138 is similar to the training data 138 described in FIG. 1.

The network interface 506 is configured to enable wired and/or wireless communications. The network interface 506 is configured to communicate data between the network device 500 and other network devices, systems, or domain. For example, the network interface 506 may comprise a WIFI interface, a local area network (LAN) interface, a wide area network (WAN) interface, a modem, a switch, or a router. The processor 502 is configured to send and receive data using the network interface 506. The network interface 506 may be configured to use any suitable type of communication protocol as would be appreciated by one of ordinary skill in the art.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. An intrusion detection system, comprising:
a memory operable to store a neural network model;
a processor operably coupled to the memory and configured to:
receive HyperText Transfer Protocol (HTTP) data;
convert the HTTP data into a data tree object, wherein the data tree object links field values from the HTTP data;
identify a field value from the data object tree, wherein the field value comprises a text string;
determine a set of feature values for the field value corresponding with input features for the neural network model, wherein the set of feature values are numeric values;
apply the determined set of feature values to the neural network model to generate an attack vector array, wherein:
the attack vector array comprises a plurality of flag bits; and
each flag bit corresponds with an attack type of a plurality of attack types;
determine the attack vector array comprises at least one flag bit set; and
trigger an event in response to determining that at least one flag bit is set.

2. The system of claim 1, wherein determining the set of feature values for the field value comprises determining a keyword count.

3. The system of claim 1, wherein determining the set of feature values for the field value comprises determining a character count.

4. The system of claim 1, wherein triggering the event comprises sending an alert.

5. The system of claim 1, wherein the processor is further configured to:
intercept the HTTP data between network devices;
generate a copy of the HTTP data; and
forward the copy of the HTTP data to a tree builder engine.

6. The system of claim 1, wherein converting the HTTP data into the data tree object comprises:
parsing the HTTP data to identify field values within the HTTP data; and
populating entries in a predetermined data structure with the identified field values.

7. The system of claim 1, wherein triggering the event comprises sending instructions to block communications with a user device.

8. The system of claim 1, wherein triggering the event comprises sending instructions to redirect communications with a user device.

9. An intrusion detection method, comprising:
receiving, by a processor, HyperText Transfer Protocol (HTTP) data;
converting, by the processor, the HTTP data into a data tree object, wherein the data tree object links field values from the HTTP data;
identifying, by the processor, a field value from the data object tree, wherein the field value comprises a text string;
determining, by the processor, a set of feature values for the field value corresponding with input features for a neural network model, wherein the set of feature values are numeric values;
applying, by the processor, the determined set of feature values to the neural network model to generate an attack vector array, wherein:
the attack vector array comprises a plurality of flag bits; and
each flag bit corresponds with an attack type of a plurality of attack types;
determining, by the processor, the attack vector array comprises at least one flag bit set; and
triggering, by the processor, an event in response to determining that at least one flag bit is set.

10. The method of claim 9, wherein determining the set of feature values for the field value comprises determining a keyword count.

11. The method of claim 9, wherein determining the set of feature values for the field value comprises determining a character count.

12. The method of claim 9, wherein triggering the event comprises sending an alert.

13. The method of claim 9, further comprising:
intercepting, by the processor, the HTTP data between network devices;
generating, by the processor, a copy of the HTTP data; and
forwarding, by the processor, the copy of the HTTP data to a tree builder engine.

14. The method of claim 9, wherein converting the HTTP data into the data tree object comprises:
parsing the HTTP data to identify field values within the HTTP data; and
populating entries in a predetermined data structure with the identified field values.

15. The method of claim 9, wherein triggering the event comprises sending instructions to block communications with a user device.

16. The method of claim 9, wherein triggering the event comprises sending instructions to redirect communications with a user device.

17. An intrusion detection system, comprising:
a web server configured to receive HyperText Transfer Protocol (HTTP) data from a user device; and
a network device, comprising:
a network interface configured to receive HTTP data sent to the web server by the user device;
a processor configured to:
generate a copy of the HTTP data; and
forward the copy of the HTTP data to a tree builder engine;
convert the copy of the HTTP data into a data tree object, wherein the data tree object links field values from the copy of the HTTP data;
identify a field value from the data object tree, wherein the field value comprises a text string;
determine a set of feature values for the field value corresponding with input features for a neural network model, wherein the set of feature values are numeric values;
apply the determined set of feature values to the neural network model to generate an attack vector array, wherein:
the attack vector array comprises a plurality of flag bits; and
each flag bit corresponds with an attack type of a plurality of attack types;
determine the attack vector array comprises at least one flag bit set; and
trigger an event in response to determining that at least one flag bit is set.

18. The system of claim 17, wherein determining the set of feature values for the field value comprises determining at least one of a keyword count and a character count.

19. The system of claim 17, wherein triggering the event comprises sending instructions to the web server to block HTTP data sent by the user device.

20. The system of claim 17, wherein triggering the event comprises sending instructions to the web server to redirect HTTP data sent by the user device.

* * * * *